United States Patent Office 3,070,452
Patented Dec. 25, 1962

3,070,452
EMULSIONS OF STARCH DERIVATIVES AND USE OF SAME FOR SIZING PAPER
George C. Harris, Wilmington, Del., and Cyrus A. Weisgerber, Chadds Ford, Pa., assignors to Hercules Powder Company, Wilmington, Del., a corporation of Delaware
No Drawing. Filed May 21, 1962, Ser. No. 196,466
20 Claims. (Cl. 106—213)

This invention relates to improved aqueous ketene dimer emulsions and to the use of the same in the sizing of paper.

It is known that higher organic ketene dimers may be formed into aqueous emulsions with various emulsifying agents, as well as with various organic thickening agents such as starch and water-soluble cellulose ethers, and that these ketene dimer emulsions are useful in the surface sizing of paper. Such emulsions, however, have not proven equally advantageous for the internal sizing of paper, as by addition to the beater.

A principal object of the invention is the provision of new and improved aqueous ketene dimer emulsions which may be used advantageously for the internal sizing of paper.

A further object of the invention is the provision of new and improved aqueous ketene dimer emulsions which are substantially more effective for the internal sizing of paper than previously known emulsions of this type.

A still further object of the invention is the provision of new and improved aqueous ketene dimer emulsions which are retained by cellulose fibers more uniformly and in much larger amounts than previously known emulsions of this type.

Another object of the invention is the provision of improvements in the sizing of paper with aqueous ketene dimer emulsions.

In accordance with the present invention, these and other objects are accomplished by the provision of aqueous ketene dimer emulsions having, as the dispersed phase, a higher organic ketene dimer or mixture of higher organic ketene dimers and, as the continuous phase, water and a cationic-nonionic starch derivative. Such starch derivatives which are particularly satisfactory for use herein are cationic-hydroxyalkyl derivatives of starch having the formula:

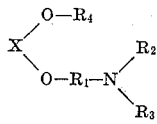

wherein X is starch, $R_1$ is selected from the group consisting of alkylene and hydroxyalkylene, $R_2$ and $R_3$ are each selected from the group consisting of alkyl, aryl, aralkyl, cycloalkyl and hydrogen, and $R_4$ is hydroxyalkyl. Of course, the $R_4$ group may stem from the same glucose unit as the

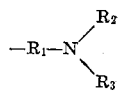

radical as shown in the above formula, or the $R_4$ group may stem from a different glucose unit than do the $R_2$ and $R_3$ groups.

The term "cationic" is used herein to mean that the starch compounds include a tertiary amino group.

While both the preparation of the cationic portion of the starch derivatives for use in this invention as well as the introduction of the hydroxyalkyl groups thereof involve etherification reactions, for simplicity we will refer to the former herein as aminoalkylation and to the latter as hydroxyalkylation. Cationic-hydroxyalkyl derivatives of starch represented by the above formula may be prepared by aminoalkylation of starches including raw starch, dextrinized starch, hydrolyzed starch, oxidized starch and the like, with an aminoalkylation agent comprising dialkylaminoalkyl epoxides, dialkylaminoalkyl halides, and the corresponding compounds containing aryl groups in addition to the alkyl groups.

Representative examples of suitable aminoalkylation agents which may be used herein include β-dimethylaminoethyl chloride; β-diethylaminoethyl chloride; β-dimethylaminoisopropyl chloride; 3 - dibutylamino - 1,2-epoxypropane; 2-bromo-5-diethylaminopentane hydrobromide; morpholinoethyl chloride; N-(2,3-epoxypropyl) piperidine; and N,N-(2,3-epoxypropyl) methyl aniline. The various halides (e.g., chloro-, bromo- and so on) can be used interchangeably. Instead of the free amines (e.g., β-diethylaminoethyl chloride), the hydrochloride or other salts of these reagents may also be used. It will also be evident that besides the alkyl, aryl and aralkyl types, aminoalkylation agents containing cyclic groups may also be used.

The starch derivatives used in this invention are prepared in an alkaline medium. Preparation is preferably accomplished by suspending the starch in water containing, or to which is later added, a sufficient amount of an alkaline material to maintain the reaction mixture in an alkaline state during the reaction. The starch products are then prepared with the required amount of aminoalkylation agent and hydroxyalkylation agent to give the degree of substitution (D.S.) desired. When the aminoalkylation and hydroxyalkylation reactions are completed, the pH of the reaction mixture is adjusted to about 5–6, e.g. with mineral acid, and the resulting product recovered by any one of a number of known means, e.g. by roll drying.

It is well known that starch, which in its natural state is in the form of discrete granules, will in the presence of water and sufficient alkali, undergo gelatinization. The phenomenon of gelatinization involves the swelling, rupture and disintegration of the starch granule, so that it will disperse in water to form a homogeneous hydrated colloidal dispersion, whereas ungelatinized starch granules, on the other hand, will settle out of water suspension and may be filtered and dried, still retaining their original granule form.

According to one process, the aminoalkylation is carried out at a temperature of about 60° C.–65° C. and then the hydroxyalkylation agent is added to the reaction mixture and the hydroxyalkylation reaction carried out at a temperature of at least about 70° C. According to a second process, the hydroxyalkylation is conducted at a temperature of at least about 70° C. and then the aminoalkylation agent is added to the reaction mixture and the aminoalkylation reaction conducted at a temperature of at least about 50° C., preferably 60° C.–65° C., or the aminoalkylation temperature may remain at the same temperature used for the hydroxyalkylation reaction. According to a third process, the aminoalkylation reaction is carried out at about room temperature and then the hydroxyalkylation agent is added to the reaction mixture and the hydroxyalkylation reaction is carried out at a temperature of at least about 70° C. According to a fourth process, both the aminoalkylation agent and the hydroxyalkylation agent are added at the same time and the aminoalkylation reaction and the hydroxyalkylation reaction are carried out simultaneously at a temperature of at least about 70° C.

As would be expected, at the lower temperatures longer time is required to obtain a given D.S., and conversely. As to maximum temperature, since the reaction is faster and, therefore, more practical, preferably the aminoalkylation temperature will be at least about 50° C. and more preferably about 60° C.–65° C. While higher temperatures than 65° C. for aminoalkylation and 70° C. for hydroxyalkylation may be used, so long as one does not decompose the reactants or starch derivative products, usually there is no advantage in using such higher temperatures. As to minimum temperatures, when aminoalkylating before hydroxyalkylating, room temperature or even temperatures can be used, but they are less practical. When aminoalkylating after hydroxyalkylating, temperatures below about 50 C. are impractical because hydroxyalkylation gives a gelatinous product. When aminoalkylating and hydroxyalkylating simultaneously, the minimum aminoalkylation temperature is obviously fixed by the minimum hydroxyalkylation temperature of about 70° C.

The granular cationic-nonionic starch ether products useful in the present invention may be prepared according to any of four processes disclosed herein for preparing the gelatinized products, e.g. using a temperature (aminoalkylation temperature and hydroxyalkylation temperature) of 0° C.–50° C., preferably about 30° C., without a gelatinization inhibitor. With the use of a gelatinization inhibitor, this temperature may be increased to about 70° C. Of course, where the aminoalkylation and hydroxyalkylation reactions are carried out separately, the temperatures need not be the same for the two reactions.

The term "granular" is used herein to designate the physical state or property of the cationic-nonionic starch ether products described herein. That is, the term granular is used to mean that the starch granule is substantially maintained, in other words that the starch is not gelatinized to any appreciable degree, during the preparation of said cationic-nonionic starch ether products. Conversely, the term "gelatinized" is used herein to designate the physical state or property of the cationic-nonionic starch ether products described herein. That is, the term gelatinized is used to mean that the starch granule is substantially ruptured, in other words that the starch is gelatinized to an appreciable degree, during the preparation of said cationic-nonionic starch ether products useful in the present invention.

For instance, the diethylaminoethyl hydroxypropyl starch used in Example 3 was prepared by aminoalkylating at 60° C.–65° C. followed by hydroxyalkylating at 70° C.–75° C. to give a gelatinized product, and the diethylaminoethyl hydroxypropyl starch used in Example 9 was prepared by simultaneously aminoalkylating and hydroxyalkylating at 70° C. in the presence of a gelatinization inhibitor to give a granular product. Further details of these preparations are given below.

PREPARATION OF STARCH DERIVATIVE USED IN EXAMPLE 3

100 grams of spray dried wheat starch, 400 grams of water and 2 grams of NaOH in 10 grams of water were agitated to prepare an aqueous alkaline starch suspension. To this suspension was added 2 grams of diethylaminoethyl chloride hydrochloride in 20 grams of water. The temperature of the suspension was brought to 60° C.–65° C. and maintained for 2 hours. Then 1 gram of ethylene oxide in 10 grams of water was added to the resulting reaction mixture and the temperature increased to 70° C.–75° C. and maintained for 4 hours. The final reaction mixture was adjusted to a pH of 5–6 with mineral acid and roll dried to obtain a gelatinized product having the following properties:

Percent nitrogen _____ 0.22, D.S. 0.03
Zeisel-Morgan value, percent _____ 1.27, D.S. 0.03

PREPARATION OF STARCH DERIVATIVE USED IN EXAMPLE 9

450 grams of spray dried wheat starch was suspended in 450 grams of water and to this suspension were added 120 grams sodium sulfate and 16 grams of diethylaminoethyl chloride hydrochloride. To the resulting suspension was added a solution of 12 grams sodium hydroxide and 12 grams sodium sulfate in 150 grams of water. To this final suspension was added 16 grams of propylene oxide, and the temperature of the suspension was brought to 70° C. and maintained for three hours. The resulting reaction mixture was adjusted to a pH of 3.0–3.5 with mineral acid, filtered, washed with water and spray dried to obtain a granular product having the following properties:

Percent nitrogen _____ 0.27, D.S. 0.03
Zeisel-Morgan value, percent _____ 1.88, D.S. 0.04

The term "alkylene oxide" is used herein to include epoxides or substituted epoxides (e.g. propylene oxide, ethylene oxide, or epoxyalkyl sulfonates such as sodium 2,3-epoxypropane sulfonate); halohydrins or substituted halohydrins (e.g. ethylene chlorohydrin, propylene chlorohydrin, sodium 2-hydroxy-3-chloropropane sulfonate).

As will be readily apparent to those skilled in the starch art, various alkaline materials are suitable for the aminoalkylation and hydroxyalkylation reactions in preparing the starch derivatives used in this invention. It is preferred to use strongly alkaline hydroxides, e.g. the alkali metal hydroxides such as sodium or potassium; the quaternary ammonium hydroxides, e.g. trimethylbenzyl ammonium hydroxide, dimethyldibenzyl ammonium hydroxide; and others. The alkali is believed to serve the three functions of (1) swelling and dispersing the starch, thus activating it, (2) participating in the aminoalkylation reaction, and (3) catalyzing the hydroxyalkylation reaction.

The proportions of aminoalkylation reagent and hydroxyalkylation reagent to be used will vary with the particular reagents chosen and the degrees of substitution (D.S.) desired. D.S. is the average number of hydroxylic hydrogens per anhydroglucose unit (i.e. the starch molecule repeating unit), replaced by the aminoalkylation reagent substituent and the hydroxyalkylation reagent substituent. There are three hydroxylic hydrogens per anhydroglucose unit, therefore the greatest total D.S. possible is three. For purposes of the present invention the aminoalkylation D.S. of the starch molecule repeating unit must be at least 0.005 and the hydroxyalkyl D.S. must be at least 0.01; the remaining hydroxylic hydrogens (2.985) may be unsubstituted or they may be substituted with additional aminoalkylation reagent or additional hydroxyalkylation reagent or both. The preferred aminoalkylation D.S. range is about 0.01–0.03 and the preferred hydroxyalkylation D.S. range is about 0.01–0.10.

The ketene dimers which are used in the instant process are dimers having the formula:

$$[RCH=C=O]_2$$

where R is a hydrocarbon radical, such as alkyl having at least 8 carbon atoms, cycloalkyl having at least 6 carbon atoms, aryl, aralkyl and alkaryl. In naming ketene dimers, the radical "R" is named followed by "ketene dimer." Thus, phenyl ketene dimer is:

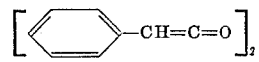

benzyl ketene dimer is:

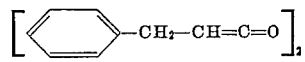

and decyl ketene dimer is: $[C_{10}H_{21}-CH=C=O]_2$. Representative ketene dimers whose emulsions may be used in the process of the instant invention include octyl, decyl, dodecyl, tetradecyl, hexadecyl, octadecyl, eicosyl, docosyl, tetracosyl, phenyl, benzyl β-naphthyl and cyclohexyl ketene dimers, as well as the ketene dimers prepared from montanic acid, naphthenic acid, Δ9,10-decylenic acid, Δ9,10-dodecylenic acid, palmitoleic acid, oleic acid, ricinoleic acid, petroselinic acid, vaccenic acid, linoleic acid, linolenic acid, eleostearic acid, licanic acid, parinaric acid, tariric acid, gadoleic acid arachidonic acid, cetoleic acid, erucic acid and selacholeic acid, as well as ketene dimers prepared from naturally occurring mixtures of fatty acids, such as those mixtures found in coconut oil, babassu oil, palm kernel oil, palm oil, olive oil, peanut oil, rape oil, beef tallow, lard (leaf) and whale blubber. Mixtures of any of the above-named fatty acids with each other may also be used.

In preparing the aqueous ketene dimer emulsions of this invention, the ingredients, namely, cationic-nonionic starch derivative, water and ketene dimer, are mixed and the mixture then subjected to vigorous shear action such as that of a Waring Blendor, a colloid mill or a homogenizer. To facilitate mixing, said starch derivative (whether using the granular derivative or the gelatinized derivative) is desirably cooked in water at about 90–95° C. for about 15 minutes, following which it is preferably cooled to about 60–65° C. or lower prior to addition of the ketene dimer. It is desirable to make these emulsions at the lowest possible temperature to avoid hydrolysis of the ketene dimer. The temperature, however, should be above the melting point of the ketene dimer and above the temperature at which the mixture is not conveniently workable because of high viscosity of said starch derivative. In general, therefore, temperatures utilized will usually vary from about 25° C. to about 95° C., preferably at least 50° C. but also about 5° C. above the melting point of the ketene dimer.

Although in preparing the starch derivative-ketene dimer emulsion when using the granular starch derivative it is preferred to first pregelatinize the starch derivative as by cooking it in water at about 90–95° C. for about 15 minutes, the emulsion can be prepared without first so pregelatinizing the starch derivative. In any event the emulsion is usually prepared at a temperature of about 60–65° C., and during this preparation some gelatinization of any ungelatinized starch derivative present normally occurs. Thus, in the immediately preceding paragraph and in claim 1, the language used to describe the continuous phase of the emulsion is intended to include starting with the starch derivative without pregelatinizing it and also to include starting with the starch derivative which has already been pregelatinized, e.g. by cooking as described above in this paragraph; starting with the starch derivative which has already been pregelatinized being referred to herein as a "pregelatinized granular cationic-nonionic starch."

The upper limit of cationic-nonionic starch concentration is that determined by the viscosity of such starch solutions which limit handling. This can be determined readily by one skilled in the art. However, as a guide, the upper limit, for most of said starch derivatives, is about 6% for usual commercial equipment. As regards the lower limit of said starch concentration, quite satisfactory emulsions may be prepared with 0.5% of such starch derivative. While it is possible to utilize smaller amounts, i.e., as little as 0.1% of said starch derivative, this will seldom be done in commercial practice because of the large volume of water needed for operation.

The concentration of ketene dimer utilized in the preparation of these emulsions may vary from as little as about 0.01% up to about 40%. The most practical range, however, is from about 1% to about 15% and this is the preferred range. The concentrations of cationic-nonionic starch and ketene dimer, hereinabove given, are percentages by weight, based on the weight of the emulsion.

The ratio of ketene dimer to cationic-nonionic starch utilized in the preparation of these emulsions may vary from about 20:1 to about 1:100 or even lower, if desired. The preferred range is from about 3:1 to about 1:10.

The use of some form of high shear apparatus appears to be important in order to prepare commercially satisfactory emulsions in accordance with the emulsification process of the present invention. Any suitable apparatus of this type such as a Waring Blendor, a colloid mill, a homogenizer or the like may be used.

While the aqueous ketene dimer emulsions of this invention may be used in the surface sizing of paper, they are particularly advantageous when utilized in internal sizing. Since internal sizing is used on most all commercial paper, the importance of this will be obvious. When utilized for internal sizing, these aqueous emulsions are added to the aqueous pulp suspension at any point after refining is complete and prior to sheet formation. It is preferred to add them as close to the point of sheet formation as possible. On a paper machine this would be at a point between and including the intake side of the fan pump and the head box.

The emulsions may be added to the pulp suspension at iny convenient concentration. This concentration will be dictated by rate of paper production, method of metering and concentration of emulsion preparation. The preferred ratio of ketene dimer to cationic-nonionic starch for purposes of such addition will depend somewhat upon the nature of the pulp and the nature and amount of impurities in the water used for sheet making. For most cases the preferred ratios are in the range of about 2:1 to 1:5. If less than this amount of cationic-nonionic starch is used in emulsion preparation, more cationic-nonionic starch solution may be added before addition of the emulsion to the pulp.

Following the addition of the aqueous ketene dimer emulsion, the aqueous pulp suspension may be sheeted and dried in the usual manner. If desired, the sheet may be cured by heating to a relatively elevated temperature, say about 100° C., for a short period of time, such as about 10 minutes. However, this is not necessary as adequate sizing develops on mere standing at room temperature for a few hours. Furthermore, with most grades of pulp, sheets prepared at pH 6.5 to 9.5 will be sized as they come off the machine so that additional curing is not needed.

The amount of ketene dimer emulsion added to the aqueous pulp suspension should be such that the cellulose fibers absorb thereon from about 0.01% to about 1%, and preferably from about 0.01 to .5%, by weight of ketene dimer, based on the dry weight of fiber. Assuming that approximately 50% of the ketene dimer in the emulsion is retained by the fibers, this will mean that the emulsion should be added to the aqueous pulp suspension in amounts such as to provide therein from about 0.02% to about 2% by weight of ketene dimer based on the dry weight of fiber.

The starches which one may start with to prepare the starch derivatives for use in this invention may be derived from any sources, including corn, wheat, tapioca, potato, waxy maize, sago or rice.

"HWS" and "HJWS" designate Huron wheat starch and an alkali-treated Huron wheat starch, respectively. As explained hereinbefore regarding D.S., the first figure given in Table 1 below is the cationic D.S. and the second figure is the nonionic D.S. As is known in the art, photometer sizing or standard feather ink resistance is the time in seconds required for the reflectance of the lower side of the sized sheet of paper to be lowered to 85% of its original reflectance value; and if the sheet is well enough sized so that a longer time than 600 seconds would be required to reach 85% of its original reflectance value, then it is the usual practice to measure the percent reflectance at 600 seconds.

The following examples represent specific embodiments of this invention.

*Examples 1–17*

3 grams of each of several starches was cooked at 90° C.–95° C. for 15 minutes in 100 ml. of water. The cooked starch, in each case, was diluted to 100 grams by addition of water, cooled to 60° C.–65° C. and 1.5 grams of a mixed tetradecylhexadecyl ketene dimer prepared from a mixture of palmitic and stearic acids added to make a crude dispersion. This crude dispersion was further dispersed by passing it three times through a preheated hand homogenizer. A 5-gram sample of the resulting emulsion was diluted to 750 ml. with water to give a 0.01% concentration of ketene dimer therein. After cooling to room temperature, this emulsion was used to size paper by adding the emulsion to an aqueous suspension of wood pulp as described above and making into paper handsheets by conventional procedure. The emulsion addition was adjusted to add 0.1% ketene dimer based on dry weight of fiber. Table 1 below gives further details of the starches used and the sizing results obtained. The starch derivatives used in Examples 3–12 and 18 and 19 were prepared under the conditions disclosed hereinbefore to give gelatinized starch derivatives. The starch derivatives used in Examples 13–17 were prepared under the conditions disclosed hereinbefore to give granular starch derivatives.

TABLE 1

| Example No. | Starch used | D.S. | Photometer sizing | |
|---|---|---|---|---|
| | | | Percent reflectance | Secs. to reach said percent reflectance |
| 1 | HJWS | zero | 85 | 158 |
| 2 | A commercial starch [1] | 0.03 | 85 | 366 |
| 3 | Diethylaminoethyl hydroxypropyl HWS | 0.03–0.03 | 91.4 | 600 |
| 4 | do | 0.03–0.06 | 89.1 | 600 |
| 5 | Diethylaminoethyl hydroxypropyl HJWS | 0.03–0.12 | 86.6 | 600 |
| 6 | Diethylaminoethyl hydroxypropyl HWS | 0.03–0.06 | 85 | 625 |
| 7 | do | 0.03–0.03 | 85 | 600 |
| 8 | do | 0.03–0.12 | 85 | 598 |
| 9 | do | 0.03–0.02 | 85 | 1074 |
| 10 | Diethylaminoethyl hydroxyethyl HWS | 0.02–0.13 | 85 | 1032 |
| 11 | Diethylaminoethyl hydroxypropyl HWS | 0.01–0.05 | 85 | 600 |
| 12 | do | 0.03–0.10 | 85 | 942 |
| 13 | do | 0.03–0.01 | 85 | 548 |
| 14 | do | 0.03–0.04 | 85 | 528 |
| 15 | do | 0.03–0.04 | 85 | 530 |
| 16 | do | 0.03–0.01 | 85 | 540 |
| 17 | do | 0.03–0.04 | 85 | 535 |

[1] A commercial cationic starch having the general formula

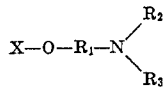

wherein X is starch, $R_1$ is ethyl, and $R_2$ and $R_3$ are each selected from methyl or ethyl.

*Examples 18 and 19*

50 grams of each of two starches was cooked at 90° C.–95° C. for 15 minutes in 950 ml. of water. The cooked starch, in each case, was diluted to 1000 grams by addition of water, and then cooled to 60° C.–65° C. 100 grams of an alkyl ketene dimer derived from stearic acid was added to the resulting aqueous starch to make a crude dispersion having a ketene dimer concentration of 9%. This crude dispersion was further dispersed by passing it twice through a Premier mill having a clearance of 2.5 mils. A 1-gram sample of the resulting emulsion was diluted with 3 grams of a 5% aqueous starch solution. The emulsion was further diluted to 250 ml. with water to give a 0.01% concentration of ketene dimer therein. After cooling to room temperature, the emulsion was used to size paper internally as described above. The emulsion addition was adjusted to add 0.1% ketene dimer based on dry weight of fiber.

To make a dispersion having a ketene dimer concentration of 13% and dilute this to a 0.01% concentration of ketene dimer in the final emulsion, the exact process as given in the paragraph immediately above was used except for the quantities of materials used as follows: 150 grams of an alkyl ketene dimer derived from stearic acid was added to the resulting aqueous starch described in the paragraph immediately above. After passing through the mill as described above, a 1-gram sample of the emulsion was diluted with 5 grams of the 5% aqueous starch solution. The emulsion was further diluted as stated above to a 0.01% concentration of ketene dimer therein and this was used to size paper. Likewise, the emulsion addition was adjusted to add 0.1% ketene dimer based on dry weight of fiber. Table 2 below gives further details of the starch used and the sizing results obtained.

TABLE 2

| Example No. | Initial ketene dimer concentration, percent | Starch used | D.S. | Photometer sizing | |
|---|---|---|---|---|---|
| | | | | Percent reflectance | Secs. to reach said percent reflectance |
| 18 | 9 | Diethylaminoethyl hydroxypropyl HWS. | 0.03–0.06 | 85.8 | 600 |
| 19 | 13 | do | 0.03–0.06 | 87.7 | 600 |

From the above examples it will be seen that the emulsions of the present invention give substantially better sizing than do emulsions employing unmodified starch (Example 1) and also those emulsions employing cationic amine-modified starch (Example 2).

As many apparent and widely different embodiments of the present invention may be made without departing from the spirit and scope thereof, it is to be understood that the invention is not limited to the specific embodiments thereof except as defined in the appended claims.

This application is a continuation-in-part of application S.N. 838,036, filed September 4, 1959, and now abandoned.

What we claim and desire to protect by Letters Patent is:

1. As a new composition of matter an aqueous emulsion consisting essentially of as the continuous phase, an aqueous mixture of a cationic-nonionic starch having the formula:

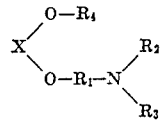

where X is starch, $R_1$ is selected from alkylene and hydroxyalkylene groups, $R_2$ and $R_3$ are each selected from hydrogen, alkyl, aryl, aralkyl and cycloalkyl groups, $R_4$ is hydroxyalkyl group and, as the dispersed phase, a ketene dimer having the formula:

$$[RCH=C=O]_2$$

where R is a hydrocarbon radical selected from alkyl having at least 8 carbon atoms, cycloalkyl having at least 6 carbon atoms, aryl, aralkyl and alkaryl, the concentration of ketene dimer being from about 0.01% to about 40% by weight, based on the weight of said emulsion, and the concentration of said starch being from about 0.1% to about 6% by weight, based on the weight of said emulsion.

2. As a new composition of matter an aqueous emulsion consisting essentially of as the continuous phase, an aqueous solution of a cationic-nonionic starch having the formula:

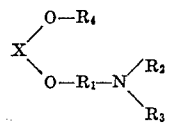

where X is starch, $R_1$ is selected from alkylene and hydorxyalkylene groups, $R_2$ and $R_3$ are each selected from hydrogen, alkyl, aryl, aralkyl and cycloalkyl groups, $R_4$ is hydroxyalkyl group, and, as the dispersed phase, a ketene dimer having the formula:

$$[RCH=C=O]_2$$

where R is a hydrocarbon radical selected from alkyl having at least 8 carbon atoms, cycloalkyl having at least 6 carbon atoms, aryl, aralkyl and alkaryl, the concentration of ketene dimer being from about 0.01% to about 40% by weight, based on the weight of said emulsion, and the concentration of said starch being from about 0.1% to about 6% by weight, based on the weight of said emulsion.

3. An aqueous emulsion as set forth in claim 2 wherein the concentration of ketene dimer is from about 1% to about 15% by weight, based on the weight of the emulsion, and the concentration of said starch is from about 0.5% to about 6% by weight, based on the weight of the emulsion.

4. An aqueous emulsion as set forth in claim 3 wherein the ratio of ketene dimer to cationic-hydroxyalkyl starch is from about 20:1 to about 1:100.

5. The method of preparing an aqueous ketene dimer emulsion which comprises forming an aqueous mixture of a cationic-hydroxyalkyl starch having the formula:

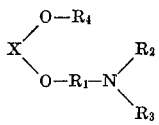

where X is starch, $R_1$ is selected from alkylene and hydroxyalkylene groups, $R_2$ and $R_3$ are each selected from hydrogen, alkyl, aryl, aralkyl and cycloalkyl groups, $R_4$ is hydroxyalkyl group, and, as the dispersed phase, a ketene dimer having the formula:

$$[RCH=C=O]_2$$

where R is a hydrocarbon radical selected from alkyl having at least 8 carbon atoms, cycloalkyl having at least 6 carbon atoms, aryl, aralkyl and alkaryl, the concentration of ketene dimer being from about 0.01% to about 40% by weight, based on the weight of said emulsion, and the concentration of said starch being from about 0.1% to about 6% by weight, based on the weight of said emulsion.

6. A process of sizing paper which comprises treating the same with an aqueous emulsion having, as the continuous phase, an aqueous solution af cationic-hydroxyalkyl starch having the formula:

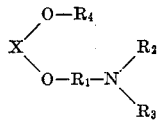

where X is starch, $R_1$ is selected from alkylene and hydroxyalkylene groups, $R_2$ and $R_3$ are each selected from hydrogen, alkyl, aryl, aralkyl and cycloalkyl groups, $R_4$ is hydroxyalkyl group, and as the dispersed phase, a ketene dimer having the formula:

$$[RCH=C=O]_2$$

where R is a hydrocarbon radical selected from alkyl having at least 8 carbon atoms, cycloalkyl having at least 6 carbon atoms, aryl, aralkyl and alkaryl, the concentration of ketene dimer being from about 0.01% to about 40% by weight, based on the weight of said emulsion, and the concentration of said starch being from about 0.1% to about 6% by weight, based on the weight of said emulsion.

7. A process for the internal sizing of paper which comprises adding to an aqueous suspension cellulosic paper stock at a point ahead of sheet formation an aqueous emulsion having, as the continuous phase, an aqueous solution of a cationic-hydroxyalkyl starch having the formula:

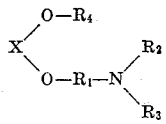

where X is starch, $R_1$ is selected from alkylene and hydroxyalkylene groups, $R_2$ and $R_3$ are each selected from hydrogen, alkyl, aryl, aralkyl and cycloalkyl groups, $R_4$ is hydroxyalkyl group, and, as the dispersed phase, a ketene dimer having the formula:

$$[RCH=C=O]_2$$

where R is a hydrocarbon radical selected from alkyl having at least 8 carbon atoms, cycloalkyl having at least 6 carbon atoms, aryl, aralkyl and alkaryl, said emulsion being added to the aqueous suspension of cellulosic paper stock in an amount to provide from about 0.02% to about 2% by weight, based on the dry weight of paper stock, of ketene dimer, forming a sheet from the said stock and drying the sheet, the concentration of ketene dimer being from about 0.01% to about 40% by weight, based on the weight of said emulsion, and the concentration of said starch being from about 0.1% to about 6% by weight, based on the weight of said emulsion.

8. A sheeted paper product containing the dried residue of an aqueous emulsion consisting essentially of, as the continuous phase, an aqueous solution of a cationic-hydroxyalkyl starch having the formula:

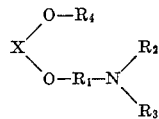

where X is starch, $R_1$ is selected from alkylene and hydroxyalkylene groups, $R_2$ and $R_3$ are each selected from hydrogen, alkyl, aryl, aralkyl and cycloalkyl groups, $R_4$ is hydroxyalkyl groups, and, as the dispersed phase, a ketene dimer having the formula:

$$[RCH=C=O]_2$$

where R is a hydrocarbon radical selected from alkyl having at least 8 carbon atoms, cycloalkyl having at least 6 carbon atoms, aryl, aralkyl and alkaryl, the concentration of ketene dimer being from about 0.01% to about 40% by weight, based on the weight of said emulsion, and the concentration of said starch being from about 0.1% to about 6% by weight, based on the weight of said emulsion.

9. An aqueous emulsion as set forth in claim 2 wherein the starch is a dialkylaminoalkyl hydroxyalkyl starch.

10. An aqueous emulsion as set forth in claim 2 wherein the starch is a dimethylaminoethyl hydroxypropyl starch.

11. An aqueous emulsion as set forth in claim 2 wherein the starch is a diethylaminoethyl hydroxypropyl starch.

12. The method as set forth in claim 5 wherein the starch is dialkylaminoalkyl hydroxyalkyl starch.

13. The method as set forth in claim 5 wherein the starch is dimethylaminoethyl hydroxypropyl starch.

14. The method as set forth in claim 5 wherein the starch is diethylaminoethyl hydroxypropyl starch.

15. The method as set forth in claim 6 wherein the starch is dialkylaminoalkyl hydroxyalkyl starch.

16. The method as set forth in claim 6 wherein the starch is dimethylaminoethyl hydroxypropyl starch.

17. The method as set forth in claim 6 wherein the starch is diethylaminoethyl hydroxypropyl starch.

18. A sheeted paper product as set forth in claim 8 wherein the starch is a dialkylaminoalkyl hydroxyalkyl starch.

19. A sheeted paper product as set forth in claim 8 wherein the starch is a dimethylaminoethyl hydroxypropyl starch.

20. A sheeted paper product as set forth in claim 8 wherein the starch is a diethylaminoethyl hydroxypropyl starch.

References Cited in the file of this patent

UNITED STATES PATENTS

| | | |
|---|---|---|
| 2,378,169 | Agre | June 12, 1945 |
| 2,414,858 | Davidson | Jan. 28, 1947 |
| 2,627,477 | Downey | Feb. 3, 1953 |
| 2,813,093 | Caldwell | Nov. 12, 1957 |
| 2,900,268 | Rankin et al. | Aug. 18, 1959 |

UNITED STATES PATENT OFFICE
CERTIFICATE OF CORRECTION

Patent No. 3,070,452                 December 25, 1962

George C. Harris et al.

It is hereby certified that error appears in the above numbered patent requiring correction and that the said Letters Patent should read as corrected below.

Column 3, line 8, after "even" insert -- lower --; column 8, lines 73 and 74, for "hydorxyalkylene" read -- hydroxyalkylene --; column 9, line 48, for "af" read -- of a --.

Signed and sealed this 2nd day of July 1963.

(SEAL)
Attest:

ERNEST W. SWIDER
Attesting Officer

DAVID L. LADD
Commissioner of Patents